United States Patent
Detro et al.

(10) Patent No.: US 6,796,663 B2
(45) Date of Patent: Sep. 28, 2004

(54) METHOD AND APPARATUS FOR MOUNTING LIQUID CRYSTAL ON SILICON (LCOS) AND OTHER SENSITIVE DEVICES

(75) Inventors: Michael Detro, Los Gatos, CA (US); Arthur Berman, San Jose, CA (US)

(73) Assignee: LightMaster Systems, Inc., Santa Clara, CA (US)

( * ) Notice: Subject to any disclaimer, the term of this patent is extended or adjusted under 35 U.S.C. 154(b) by 0 days.

(21) Appl. No.: 10/251,104

(22) Filed: Sep. 20, 2002

(65) Prior Publication Data

US 2003/0202163 A1 Oct. 30, 2003

Related U.S. Application Data

(60) Provisional application No. 60/360,770, filed on Mar. 1, 2002, provisional application No. 60/360,802, filed on Mar. 1, 2002, and provisional application No. 60/356,207, filed on Feb. 11, 2002.

(51) Int. Cl.[7] .................. G03B 21/00; G03B 21/28; G03B 21/14; G02F 1/1333
(52) U.S. Cl. .................. 353/122; 353/31; 353/81; 353/82; 349/56; 349/58
(58) Field of Search .................. 353/122, 31, 33, 353/81–82; 349/56, 58

(56) References Cited

U.S. PATENT DOCUMENTS

| | | | |
|---|---|---|---|
| 4,544,237 A | 10/1985 | Gagnon | 349/9 |
| 4,913,528 A | 4/1990 | Hasegawa | 359/638 |
| 5,168,351 A | 12/1992 | Bradley | 348/78 D |
| 5,177,629 A | 1/1993 | Bohannon | 349/74 |
| 5,497,268 A | 3/1996 | Tang | 359/573 |
| 5,838,397 A | 11/1998 | Stephens | 349/5 |
| 5,953,087 A * | 9/1999 | Hoyt | 349/58 |
| 6,056,407 A * | 5/2000 | Iinuma et al. | 353/119 |
| 6,280,037 B1 * | 8/2001 | Smith | 353/31 |
| 6,375,330 B1 | 4/2002 | Mihalakis | 353/31 |
| 6,406,151 B1 | 6/2002 | Fujimori | 353/119 |
| 6,415,093 B1 | 7/2002 | Nakamura et al. | 385/141 |
| 6,504,661 B1 | 1/2003 | Odille et al. | 359/892 |
| 6,509,938 B2 * | 1/2003 | Okada et al. | 349/5 |
| 2001/0024556 A1 | 9/2001 | Beguin et al. | |
| 2002/0140905 A1 | 10/2002 | Ouchi et al. | |
| 2002/0176054 A1 * | 11/2002 | Mihalakis | 353/31 |

FOREIGN PATENT DOCUMENTS

| | | | |
|---|---|---|---|
| EP | 0580169 | 1/1994 | |
| GB | 2027956 A * | 2/1980 | G04B/37/08 |
| JP | 04-005428 | 7/1993 | |

OTHER PUBLICATIONS

U.S. patent application Publication No. 2002/0140905 A1.*

* cited by examiner

Primary Examiner—Russell Adams
Assistant Examiner—Magda Cruz
(74) Attorney, Agent, or Firm—John W. Carpenter; Reed Smith LLP (57) ABSTRACT

A device package has a bezel attached to a carrier. The bezel extends toward a surface of an optical component to which a device mounted in the carrier is attached. The bezel extends in a direction and to a distance that allows the bezel to act as a guide for a dislodging tool. The dislodging tool is guided to an interface where an adhesive attaches the device to the optical component. Preferably, the device is a microdisplay attached to a prism assembly. The bezel may also be used to attach the device package to the optical component with either an air gap or a liquid coupling the microdisplay (and/or an optical stack) and the optical component. An air bladder, air bubble, or tube device is included in the liquid coupling to accommodate expansion of the liquid.

81 Claims, 8 Drawing Sheets

METHOD AND APPARATUS FOR MOUNTING LIQUID CRYSTAL ON SILICON (LCOS) AND OTHER SENSITIVE DEVICES

CROSS REFERENCE TO RELATED APPLICATIONS AND CLAIM OF PRIORITY

This invention claims priority to the following co-pending U.S. provisional patent applications, which are incorporated herein by reference, in their entirety:

Detro et al, Provisional application Ser. No. 60/360,770, entitled "A LCoS Package that Enables Direct Mounting of the Microdisplay to the Prism Assembly and that is Also Demountable," filed, Mar. 1, 2002;

Detro et al, Provisional application Ser. No. 60/360,802, entitled "A LCOS Package that Enables Direct Mounting of the Microdisplay to the Prism Assembly and that Minimizes Stress," filed, Mar. 1, 2002; and Detro et al., U.S. Provisional patent application U.S. Ser. No. 60/356,207, entitled "Means to Accommodate Expansion in Liquid Coupled Prism Assemblies," filed Feb. 11, 2002.

This application also makes reference to Detro et al., U.S. patent application Ser. No. 10/202,595, entitled "METHOD AND APPARATUS FOR CONFIGURATION AND ASSEMBLY OF A VIDEO PROJECTION LIGHT MANAGEMENT SYSTEM," filed Jul. 24, 2002, the contents of which are incorporated herein by reference in its entirety.

BACKGROUND OF THE INVENTION

1. Field of Invention

The present invention relates to mounting devices and techniques for sensitive components or parts. The invention is more particularly related to the mounting or attachment of an Liquid Crystal on Silicon (LCOS) microdisplay directly to a surface of a prism assembly. The invention also features a structure that allows the LCoS or other mounted component to be demounted from the prism assembly should it be necessary for reasons such as repair, inspection, etc., and other mounting and mating features that minimize the build up of thermally and/or mechanically induced stress near and in the microdisplay.

2. Discussion of Background

Figure 1:
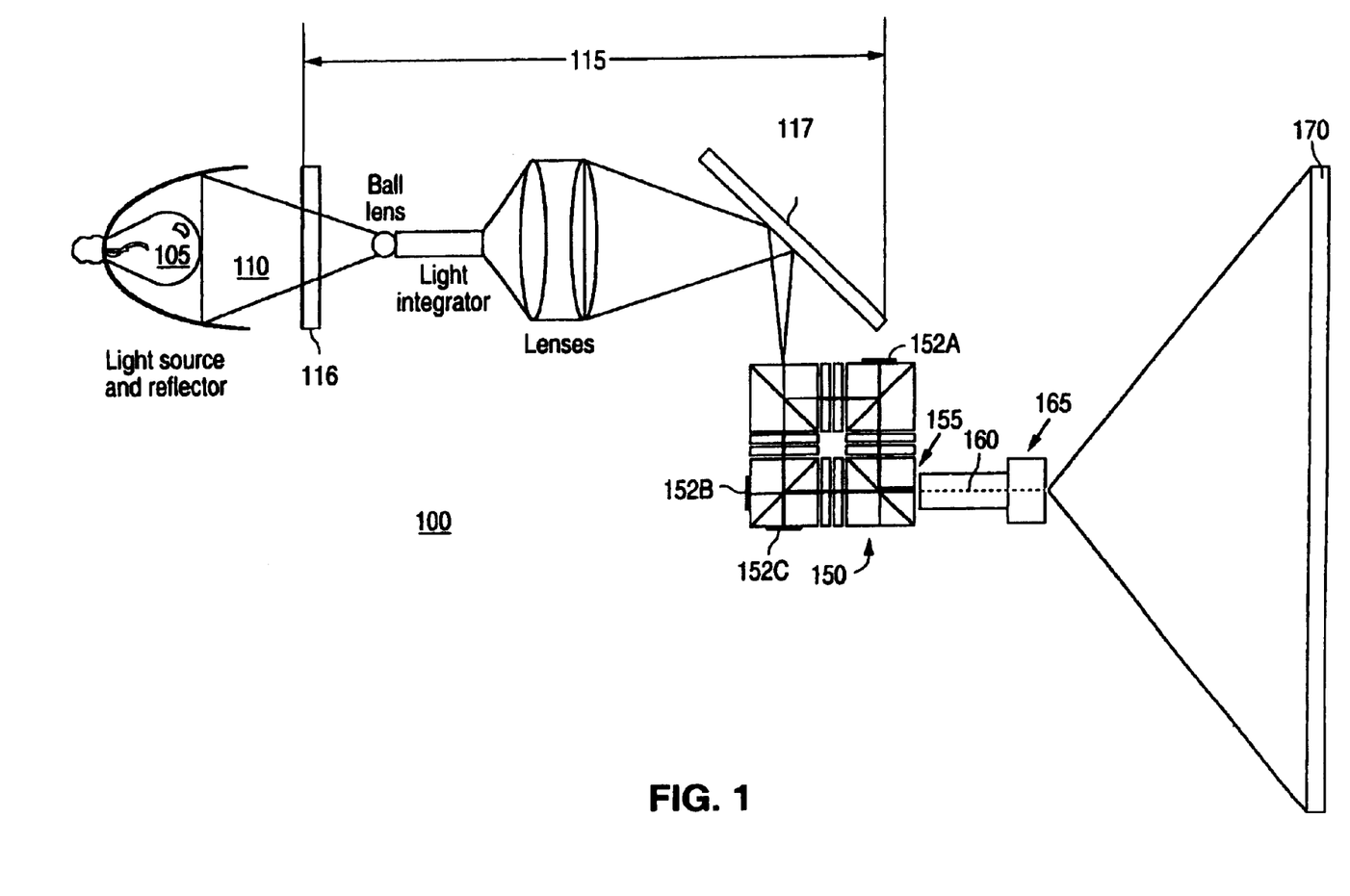
FIG. 1 is a drawing of a LCOS based video projector.

Light Engines are utilized in optical devices, particularly projection video devices and generally comprises a light source, condenser, kernel, projection lens, and a display screen, and related electronics. The function of the components of an LCoS based video projector 100 is explained with reference to FIG. 1. As shown, white light 110 is generated by a light source 105. The light is collected, homogenized and formed into the proper shape by a condenser 115. UV and IR components are eliminated by filters (e.g., hot/cold mirrors 116/117). The white light 110 then enters a prism assembly 150 where it is polarized and broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam displays the green content of a full color video image. The reflected green beam then contains the green content of the full color video image. Similarly for the blue and red microdisplays. On a pixel by pixel basis, the microdisplays modulate and then reflect the colored light beams. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

Many different prism assemblies are commercially available in many varying configurations. However, the kernel is generally the optical heart of the light engine. The kernel is composed of the prism assembly and three LCOS microdisplays. Establishing the physical/spatial relationship between the microdisplays and the prism assembly is an important aspect of light engine design and production.

Figure 2:
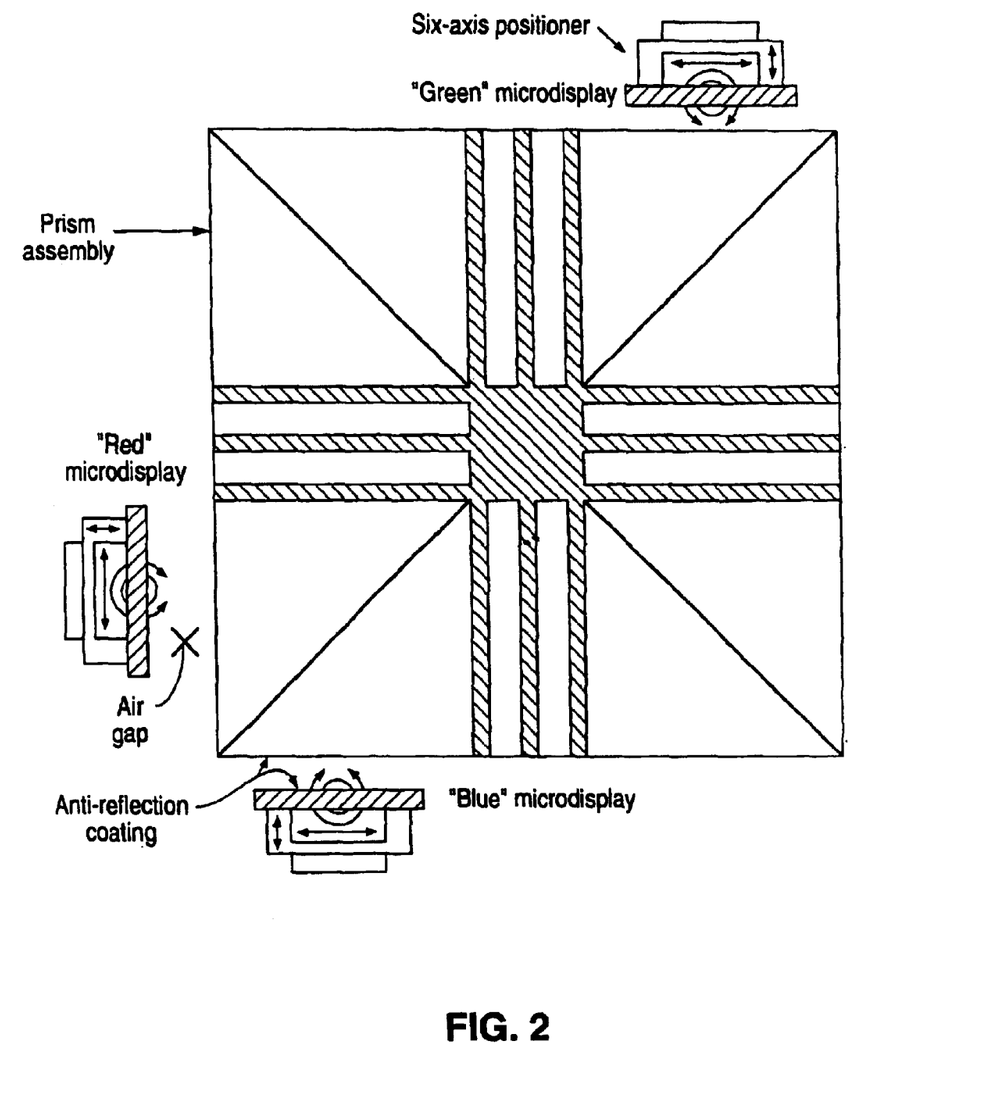
FIG. 2 is an illustration of a conventional six-axis mounting system for alignment of microdisplays on a prism assembly.

The current state of the art in establishing a physical relationship between the microdisplays and the prism assembly utilizes an air gap between the surfaces of the prism assembly and the upper surfaces of the microdisplays. FIG. 2 is an illustration of a conventional six-axis mounting system for alignment of microdisplays on a prism assembly. As illustrated in FIG. 2, the physical relationship of the microdisplays is established by mounting each microdisplay on an individual six-axis adjustment stage. The assembly process requires a procedure for mutually aligning the microdisplays to an accuracy that is typically on the order of +/−2 microns. There are several unfavorable consequences that follow as a result of adopting this mounting approach:

The cost of each light engine includes the considerable expense of three, six-axis positioners.

After initial set up, it is unlikely that the three microdisplays will remain within the required alignment tolerance during subsequent assembly process, steps and during product transport.

An additional expense is incurred with the application anti-reflection (AR) coatings to the front surfaces of the three microdisplays and the three facing surfaces of the prism.

The AR coated surfaces are exposed to dust, moisture and atmospheric contaminates and are therefore likely to deteriorate with time which will result in a degraded projected image.

A solution to the above stated problems is to mount and optically couple the microdisplays directly to the surfaces of the prism. Direct mounting reduces the cost by at least the price of the 3 six-axis adjustment stages, requires no post production alignment or other adjustments because the microdisplays are fixed in position, and eliminates or reduces the need for anti-reflection coatings. However, despite the considerable advantages that could be derived by doing so, few companies currently build kernels in this configuration. One reason is the difficulty in reworking defective products. That is, a defective directly mounted microdisplay is difficult to remove from an otherwise good prism assembly. Conversely, good microdisplays are difficult to remove from a defective prism.

In addition, direct mounting of microdisplays causes other problems, including the build up of stress as the temperature of the light engine increases during operation. The origin of the stress is the difference in the coefficient of thermal expansion that exists between the materials in the prism and in the microdisplay. Consequences of stress include:

Birefringence in the prism and cover glass of the microdisplay. The birefringence can cause distortion in the projected image; and Physical distortion of the microdisplay. Such distortion induces fringing that will be visible in the projected image.

SUMMARY OF THE INVENTION

The present inventors have realized the need to provide a device or method for direct mounting of microdisplays in a manner that allows for easy removal. The invention described herein allows the microdisplay to be mounted directly to the surfaces of the prism such that the microdisplay can be de-mounted should the need arise. And, the present invention includes procedures and techniques to bond the microdisplay to the prism in such a way as to minimize the build up of stress.

The present invention is embodied as an optical device, comprising, an optical component, a microdisplay mounted to the optical component with an adhesive, and a guide mounted in relation to the optical component and the microdisplay such that insertion of a dislodging tool in the guide results in an increased probability that the dislodging tool strikes the adhesive bond between the microdisplay and prism.

In another embodiment, the present invention is a microdisplay package, comprising, a carrier having a mounting surface capable of affixing to a non-optical surface of a microdisplay, and a bezel extending from the carrier in a direction of an optical surface of the microdisplay, wherein, when said microdisplay is fixed to a device surface with an adhesive layer, the bezel acts as a guide for a dislodging tool to impact the adhesive layer.

In another embodiment, the present invention is a device package, comprising, a carrier comprising a substantially planar platform having a mounting area suitable for affixing to a non-optical surface of a microdisplay, and a bezel extending from the carrier toward a plane defined by an optical surface of the microdisplay when the microdisplay is affixed to the mounting area at the non-optical surface.

In yet another embodiment, the present invention is a device package, comprising, a device, a carrier comprising a substantially planar platform affixed to a non-optical surface of the device, and a bezel extending from the carrier toward a plane defined by an optical surface of the device.

Ultimately, the present invention is preferably suited for use in a light engine of a projection television, computer monitor, or other display device. Therefore, the present invention may also be embodied as a projection television, comprising, a screen, a prism assembly including a microdisplay fitted into a package, said package comprising a carrier having a substantially planar platform affixed to a first surface of the microdisplay, a bezel extending from the carrier toward a plane defined by a second surface of the microdisplay opposite the first surface, a light engine coupled to said prism assembly, and a lens configured to focus light emitted from said prism assembly onto the screen.

Thus, the present invention provides the best advantages of both a direct mounting technique (e.g., fixed registration, low mounting cost), and an adjustable axis mounting technique (easy removal for maintenance/replacement, low/no stress build-up between microdisplay and prism).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have determined that a positive, firm strike from a dislodging tool, such as a razor blade or chisel, can effectively break the adhesive layer between a microdisplay and an optical component without incurring damage to the microdisplay or prism. Damage to the microdisplay is more likely if the dislodging tool strikes at the microdisplay. Therefore the dislodging tool must be guided to impact only the adhesive layer. However, it is preferable that the strike occur at the interface between an adhesive layer (e.g., see adhesive layer 330 in FIG. 3A) and the optical component, and that the strike be as near as possible to parallel with a surface of the optical component to which the microdisplay is mounted.

Figure 3A:
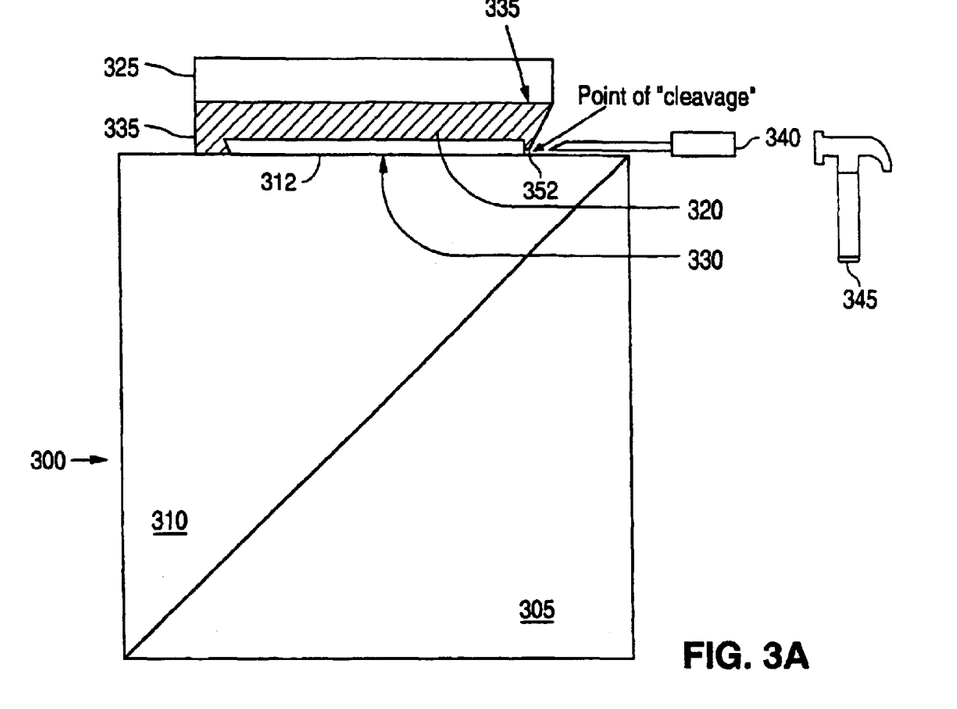
FIG. 3A is an illustration of a package for mounting a microdisplay to a Polarizing Beam Splitter according to an embodiment of the present invention.

Referring again to the drawings, wherein like reference numerals designate identical or corresponding parts, and more particularly to FIG. 3A thereof, there is illustrated a package for mounting a microdisplay 320 to a Polarizing Beam Splitter (PBS) 300. The package may be used to mount the microdisplay 320 to a PBS, prism, or other optical equipment. The package may also be used to mount other sensitive electronics or optical devices to any surface. The illustrated PBS is part of a light engine and is constructed of two prisms 305 and 310. An upper surface 312 of prism 310 is used for mounting the microdisplay 320. In this embodiment, the microdisplay 320 is preferably attached to the prism upper surface 312 via adhesive 330 (e.g., UV cured optical adhesive). Thus, a face of the microdisplay is bonded to a face (e.g., upper surface 312) of the prism with an adhesive.

The package includes a carrier 325, which is preferably a flat ceramic plate. However, other materials may be substituted instead of ceramics. The carrier also preferably provides means (electrical connections, through holes, etc) to make electrical contact or connections for energizing and sending image or other data to the microdisplay 320. The carrier itself may extend beyond one or more edges of the microdisplay 320. The extension of the carrier causes the carrier to overhang the microdisplay. The extension, or overhang, acts as a guide that helps guide insertion of a dislodging tool (e.g., chisel 340) at an angle such that the chisel contacts the adhesive. Contacting only the adhesive (or interface between the adhesive and prism 310) prevents damage that would likely occur to the microdisplay if it was directly impacted by the dislodging tool (e.g., tool 345).

An optional bezel 335 is preferably attached to at least one portion of the carrier. In one embodiment, the bezel surrounds the microdisplay and is bonded to the carrier (e.g., bonded to the carrier overhang). The bezel extends below the microdisplay, protecting it from direct impact with any object, including any dislodging tools. Preferably, the bezel provides an opening or "notch" 352, for inserting the striking end of a dislodging tool. For example, a dislodging tool 340 is inserted between the prism face 312 and the microdisplay 320, preferably at the interface of the prism surface 312 and adhesive layer 330, as provided for by the notch 352.

Although preferably attached to the carrier, the bezel may alternatively be attached to mounting points affixed to the prism 310, or otherwise positioned to place the guide, or "notch" in position for a dislodging tool to be inserted above the prism face and below the microdisplay 320.

Figure 3B:
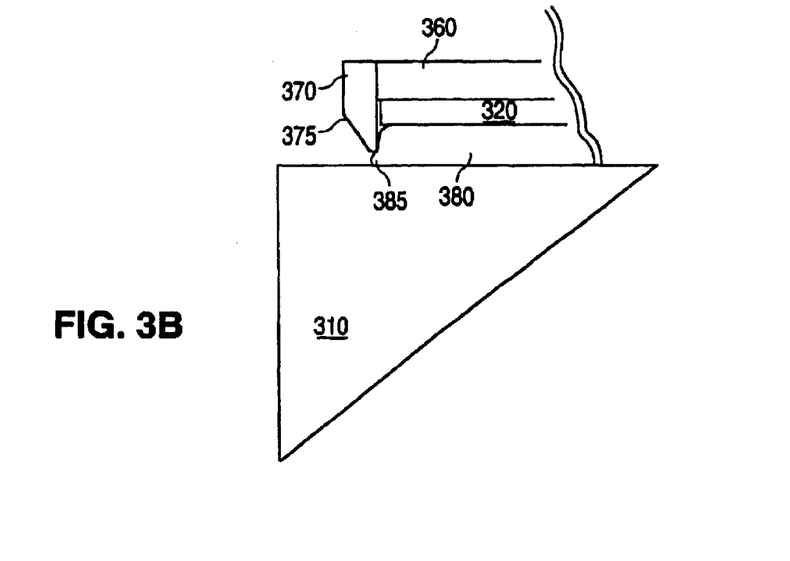
FIG. 3B is an illustration of a package for mounting a microdisplay with an elongated bezel attached to a carrier according to an embodiment of the present invention.

In another embodiment, shown in FIG. 3B, a carrier 360 is roughly the same dimensions as a microdisplay 320. A bezel 370 is then elongated to attach to a side of the carrier 360 and extend downward along the microdisplay 365. The bezel 370 preferably includes a sloped edge 375 for guiding a chisel, razor blade, or other dislodging tool toward the adhesive layer 380.

In addition to providing a sloped edge for the insertion of the dislodging tool, another function, of the bezel 335/370 is to constrain the adhesive used to bond the microdisplay to the carrier. Preferably, the adhesive is constrained to a restricted area surrounding the microdisplay within the inner boundaries of the bezel. Constraining the adhesive 330/380 is useful in the manufacture of prism assemblies or other optical elements that use microdisplays. Also, if at any time it becomes necessary to remove the microdisplay from the prism, a sharp chisel (such as a razor blade) is inserted into a notch formed by the bezel and sloped edge. The notch is a space between the bezel and PBS surface that allows insertion of the chisel. Preferably, the notch locates the edge of the chisel exactly at the interface between the constrained adhesive layer and the prism face, and the microdisplay is cleaved from the prism by application of a sharp blow to the chisel.

Bezel 335 includes a guide for guiding the dislodging tool toward the notch 352. A sloped edge 350 of bezel 335 directs a dislodging tool being inserted toward notch 352 and the interface between the prism surface 312 and adhesive layer 330. The point of cleavage is the point where the dislodging tool 340 impacts the adhesive and breaks the seal between the microdisplay 320 and prism 310. Preferably, the point of cleavage is the interface between the adhesive 330 and prism 310 and located opposite a side of the microdisplay having attachments or cabling for power or data transfer. In one alternative, the slope begins at a point below the carrier to just above the interface of the adhesive layer and prism surface 312 (see sloped edge 375).

The microdisplay attached via adhesive to an optical component is well secured from forces occurring from any origin (e.g., shipping, customer movement, etc.), and the microdisplays will maintain their registration even with the application of many different forces. However, a sharp blow applied as discussed above instantly releases the microdisplay. The present inventors have performed numerous field tests and striking the adhesive at the interface of the adhesive and the optical component, and, not only is the microdisplay released, but the adhesive is also cleanly removed (minor additional clean up using acetone, alcohol, or other cleaning material may be required in some cases).

The microdisplay, and therefore the carrier, are generally rectangular in shape. Although the present inventors prefer placing the notch on the long side of the rectangle, the point of cleavage, or notch, may be placed on either a long side, short side, or multiple sides of the rectangle. Most microdisplays include an electrical connector on one side, and, therefore, the connector side of the microdisplay is preferably not provided with a notch.

The height of the bezel may vary. The adhesive layer 330 may be contained completely within the boundaries of the bezel (as shown), or certain amounts of the adhesive may seep under part of the bezel (not shown). An amount of gap (notch height) between the bezel and prism surface 312 may be adjusted to allow more or less seepage. Seepage under the bezel is illustrated as 385 in FIG. 3B). In either scenario, the bezel still functions to provide a guide for the dislodging tool and to constrain the adhesive.

Figure 4:
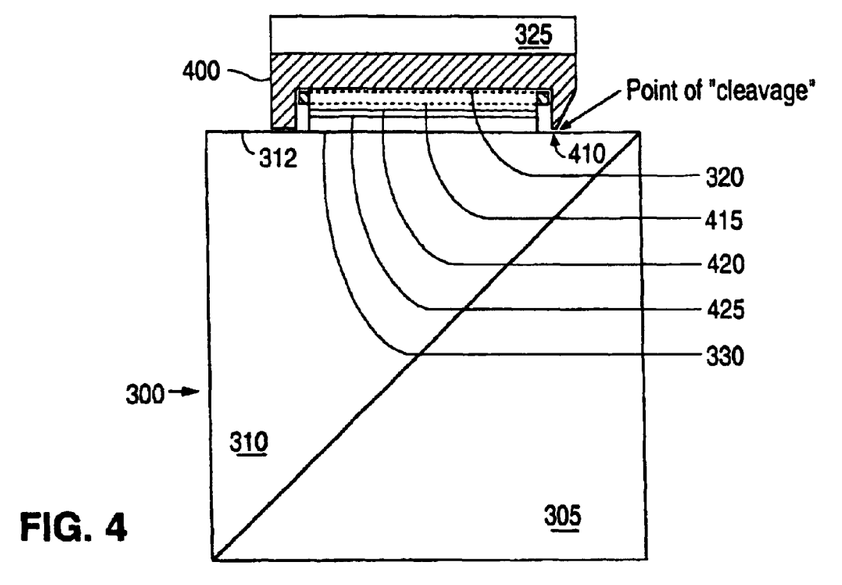
FIG. 4 is an illustration of a more complex package assembly and mounting according to an embodiment of the present invention.

Note that the disclosed package configuration is consistent with the inclusion of other possibly desired optical elements such as a compensating waveplate and/or a light mask. The exact number, type, and configuration of other optical elements will depend on engineering considerations for a particular design. A more complex package assembly is illustrated in FIG. 4, which includes a taller bezel 400, including a notch part 410, and additional optical elements. The additional optical elements include, for example, a black mask 415, spacer glass 420, and quarter waveplate 425. Other optical elements or devices may be arranged similarly or in various combinations depending on the specific application. The number and arrangement of optical elements can become quite extensive and is referred to as an optical stack. Regardless of the number, type, or arrangement of components in the optical stack, in the thus far described embodiments, the bezel acts as a guide to place the dislodging tool at the interface between prism surface 312 and the adhesive layer 330.

The black mask is a light shield that has a opening cut out for the active matrix array (or liquid crystal elements) of the microdisplay 320. The black mask acts as an optical shield to prevents excess light from contacting any of the light sensitive transistors at or near the exposed active matrix array of the microdisplay 320. The black mask protects the silicon above and beyond protection afforded by other thin films in the silicon that protect the transistors in the silicon and allows light to interact with liquid crystal elements.

Figure 5:
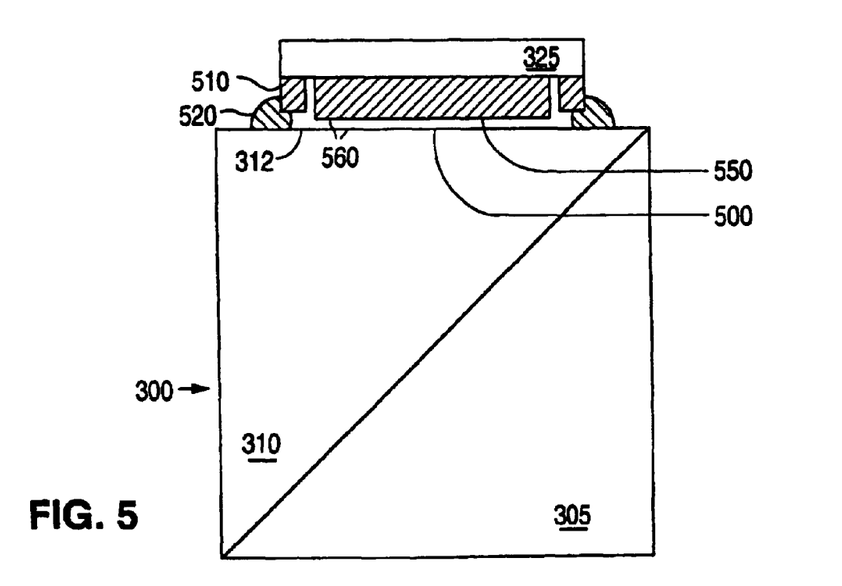
FIG. 5 is an illustration of a package configuration mounting that reduces stress according to an embodiment of the present invention.

FIG. 5 is an illustration of a package configuration that includes features that reduce stress. As seen in FIG. 5. an air gap 500 exists between a front surface of the microdisplay 550 and the face of the prism (prism surface 312). The air gap 500 physically decouples the microdisplay from the prism and prevents the build up and transmission of stress. The air gap 500 also acts as a "thermal insulator" and moderates any temperature increase of the microdisplay caused by the temperature of the PBS 300 or other environmental factors that might generate heat. This minimizes any physical distortion that may be generated within the microdisplay 550 because of temperature changes or differences in thermal expansion of the microdisplay 550 (or any of its parts) and the PBS 300.

A bezel 510 is glued (via adhesive 520) to the face of the prism (e.g., prism surface 312). The adhesive 520 holds the bezel and attached package and, hence, the microdisplay, firmly in place maintaining registration between the three microdisplays (registration refers to aligning the pixel arrays of each microdisplay—e.g., pixel 1,1 of each microdisplay process a same pixel output at position 1,1 in the output image). In the previously described embodiments, the microdisplay 320 was glued to the prism surface 312, which also maintained registration of the microdisplay 320 with the other microdisplays. Preferably, the glued microdisplay 320 is part of a multi microdisplay device, such as a light engine, but could be part of a different device, in which case the microdisplay (or other optical or electronic device) is glued in a position that maintains a registration needed for that different device. In this example embodiment, the package includes a carrier 325 and microdisplay 550, which, because of the air gap 500, does not contact the prism surface.

In one embodiment, the height of the bezel is less than that of the upper surface of the microdisplay (note bezel height relative to the microdisplay in FIG. 5). However, other bezel heights may be utilized depending on a particular application or arrangement of additional optical elements (note bezel height in FIG. 6 extends below the upper surface of the microdisplay).

The package, including the carrier, bezel, and microdisplay is mounted to the prism 310 by holding the package in a precise position that is registered with other microdisplays or required lightpaths of a device being constructed, and then adhesive is applied to the bezel and prism surface 312. During the process of mounting the package to the prism, the package is held in the precise position by a precise adjusting mechanism, such as a multi-axis clamp having a fine adjustment (e.g., micrometer adjustment) for each axis.

The present invention includes the method for mounting the package. As a first step, the upper surface of the microdisplay is brought into direct contact with the face (e.g., surface 312) of the prism. This establishes proper tip and yaw orientation of the microdisplay with respect to the face of the prism. The microdisplay is then backed off from the prism to establish the air gap. The distance backed off is carefully controlled by the precise adjusting mechanism (e.g., using a back-off micrometer adjustment) and is typically quite small, on the order of mils. The adhesive 520 is placed in a bead between the face of the prism and the edges of the bezel 510.

In the above disclosed air gap configuration it is desirable to include an anti-reflection coating on the upper surface of the microdisplay and on the facing surface of the prism (e.g., as shown in FIG. 5, AR coatings are located at positions indicated by the lines noted as 560, but the coatings themselves are not illustrated).

Figure 6:
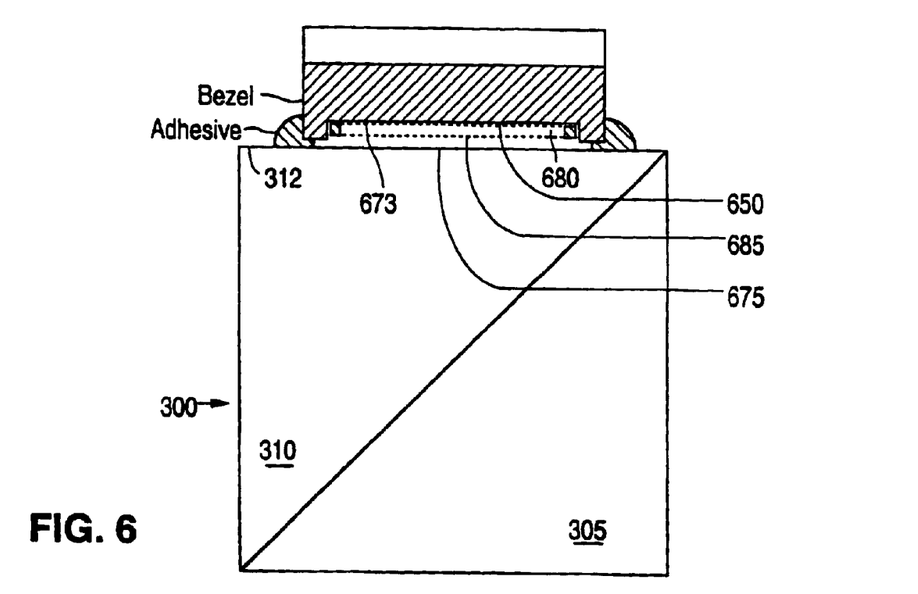
FIG. 6 is an illustration of a more complex optical stack arranged in an air gap mounting embodiment of the present invention.

The embodiment of FIG. 5 may also be extended to include multiple other optical elements in an optical stack. FIG. 6 is an illustration of a more complex optical stack arranged in an air gap embodiment of the present invention. The optical stack in FIG. 6 includes an air gap 673 from the upper surface of the microdisplay 650 to a black mask 685. Another air gap 675 extends from the surface 312 of prism 300 up through an opening 680 of black mask 685 and meets with air gap 673. The black mask 685 acts as a light shield to protect transistors, exposed silicon, and/or other components other than the parts of the microdisplay that are intended to be exposed to the light paths through the prisms and optical stack. Note that an air gaps exists on either side of the black mask (the combined air gaps 673 and air gap 675) which mechanically and thermally isolate the black mask from both the microdisplay and the prism. In one embodiment, the black mask 685 is held in position by an adhesive bead or drops of adhesive cured on each of the black mask and the bezel. In other embodiments, insulating stubs protrude (e.g., from the prism face 312 or the microdisplay 650) and attach to the black mask. Any other method of securing the black mask to maintain its position is appropriate.

Figure 7:
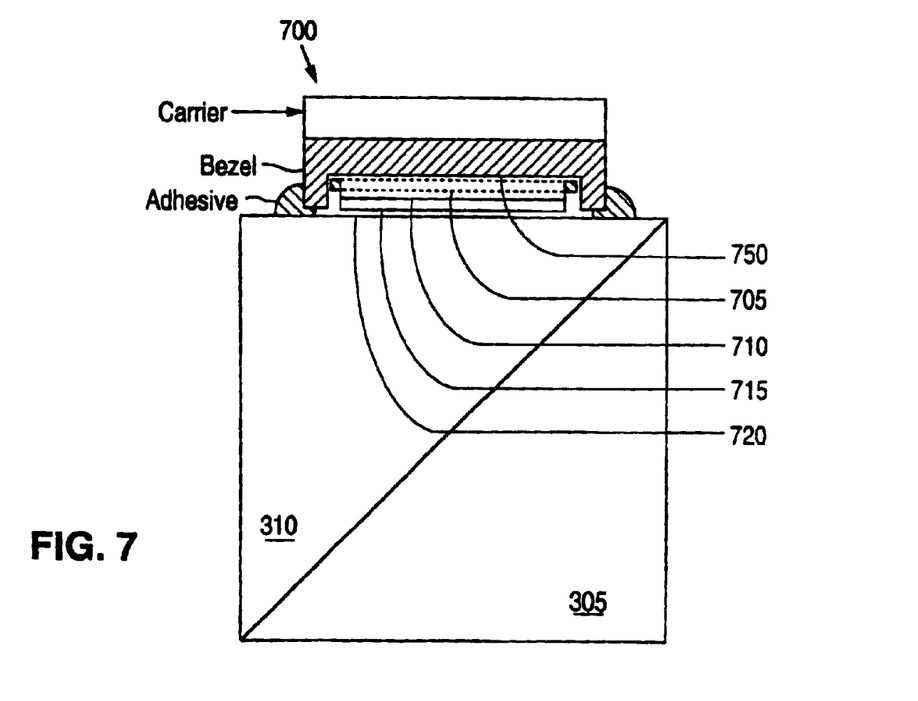
FIG. 7 is an illustration of an example of a microdisplay package and mounting that includes an optical stack having a quarter waveplate and a black mask according to an embodiment of the present invention.

A quarter waveplate or other optical elements may also be included with or substituted for the black mask in the optical stack. FIG. 7 is an example of a microdisplay package 700 that includes an optical stack having a quarter waveplate 715 and a black mask 705. As indicated in FIG. 7, the example optical stack also includes a space glass 710 and the optical stack precedes a microdisplay 750. Not illustrated in FIG. 7 is a cover glass on the outer surface of the quarter waveplate 715. Such a cover glass would become the "top" layer in the optical stack (situated between the quarter waveplate 71 5 and the air gap 720). The desirability of including the extra cover glass derives in part from the fact that it is easier to apply an anti-reflection coating to glass.

Figure 8:
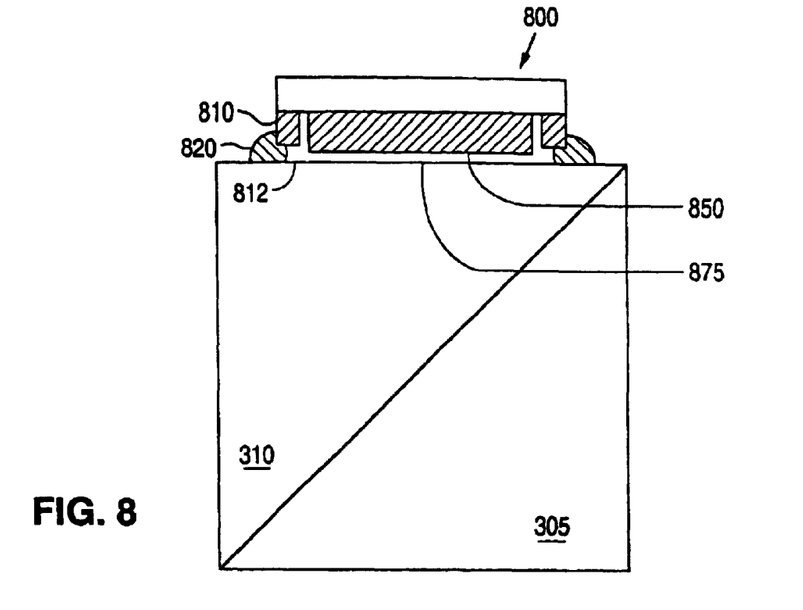
FIG. 8 is an illustration of a microdisplay package and mounting that includes optical coupling according to an embodiment of the present invention.

Another embodiment of the present invention is illustrated in FIG. 8. In this embodiment, an index matching fluid has been injected through a small gap or hole (not shown). The index matching fluid provides a liquid coupling that fills the air gap(s) within the microdisplay package 800 and between the microdisplay package and prism 310 (e.g., as shown in FIG. 8, the index matching fluid is an optical coupling fluid 875 between a face 812 of prism 310 and the microdisplay package 800).

In one embodiment, the fill hole is closed off using an adhesive after the filling process is complete. The small gap may be a small hole in the bezel 810, or a tube through the adhesive 820. Any opening that provides access to the air gap may be utilized. The hole, tube, or gap is filled with adhesive or a plug is inserted to seal in the liquid (index matching fluid).

The use of the index matching fluid greatly reduces or eliminates the need for the anti reflection (AR) layers on the prism, microdisplay, and/or other elements of the optical stack. The liquid coupling will also as effective in not transmitting or sustaining the build up of stress. The liquid coupling method is compatible with the inclusion of a black mask and/or waveplates in an optical stack.

Preferably, the index matching fluid has an index of refraction that matches an index of refraction of the optical pieces which it couples. However, in most embodiments, the coupled optical pieces will have different indexes of refraction, therefore, the preferred index of refraction of the coupling fluid is a s close as possible to an average index of refraction of the coupled optical pieces. For example, in FIG. 8, the index of refraction of the index matching fluid is as close as possible to the index of refraction (ir) of prism 310 plus the index of refraction of an optical surface of the microdisplay 850 divided by 2 (e.g., (ir 310+ir 850)/2). The selected index of refraction for any of the optical pieces and/or fluids will also be varied by their availability in the desired properties.

Note that it is preferable to provide accommodations to allow for the differential expansion of the index matching fluid as compared to the package "container". Various possible accommodations are discussed in Detro et al., U.S. Provisional Patent Application Serial No. 60/356,207, entitled "Means to Accommodate Expansion in Liquid Coupled Prism Assemblies." The described accommodations can each be applied to the microdisplay package 800. In one embodiment, an air bubble 1130 (e.g., see FIG. 11) is trapped inside the perimeter of the bezel 810 and adhesive 820. The trapped air bubble is preferably a size such that it is lodged out of the lightpaths that are incident with the microdisplay. In one embodiment, the air bubble 1130 is lodged between the microdisplay 850 and bezel 810. Preferably, an orientation of the package helps maintain the air bubble out of the light paths.

In another embodiment, an air bladder 1000 (e.g., see FIG. 10) is inserted in the package. One location for placing the air bladder 1000 is between the microdisplay 850 and bezel 810. The bezel 810 may be extended at one part to accommodate inclusion of an air bladder, and the air bladder may be fixed to the bezel (preventing it from drifting into the microdisplay incident lightpath).

Figure 10:
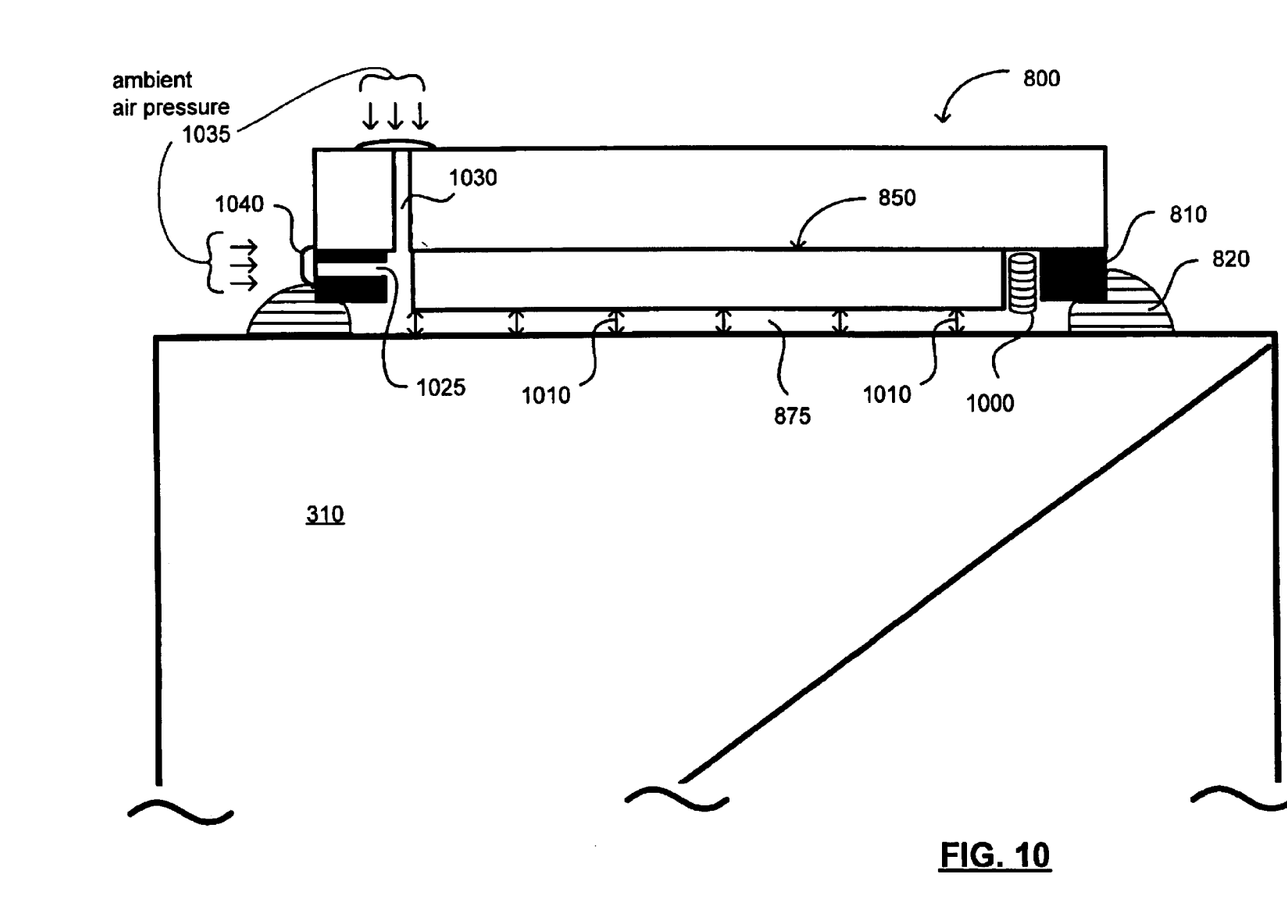
FIG. 10 is an illustration of an air filled bladder lodged out of light paths according to an embodiment of the present invention.

In another embodiment, a flexible diaphragm is placed over an opening in the microdisplay package 800. The opening (e.g., 1025 or 1030) leads to the index matching fluid and is sealed by the diaphragm (e.g., 1040 or 1045) which flexes with expansion and contraction of the, index matching fluid. The opening is preferably located on the bezel, but may be paced in any location that provides access to the index matching fluid.

In yet another embodiment, a tube is inserted into the microdisplay package 800. Preferably, the tube (e.g., 1100, see FIG. 11) is inserted through a hole (e.g., 1025) drilled in the bezel. The tube is open at the end inserted into the microdisplay package and sealed at the outer end. An air bubble (e.g., 1105) is maintained in the tube which expands or contracts with the index matching fluid.

Figure 11:
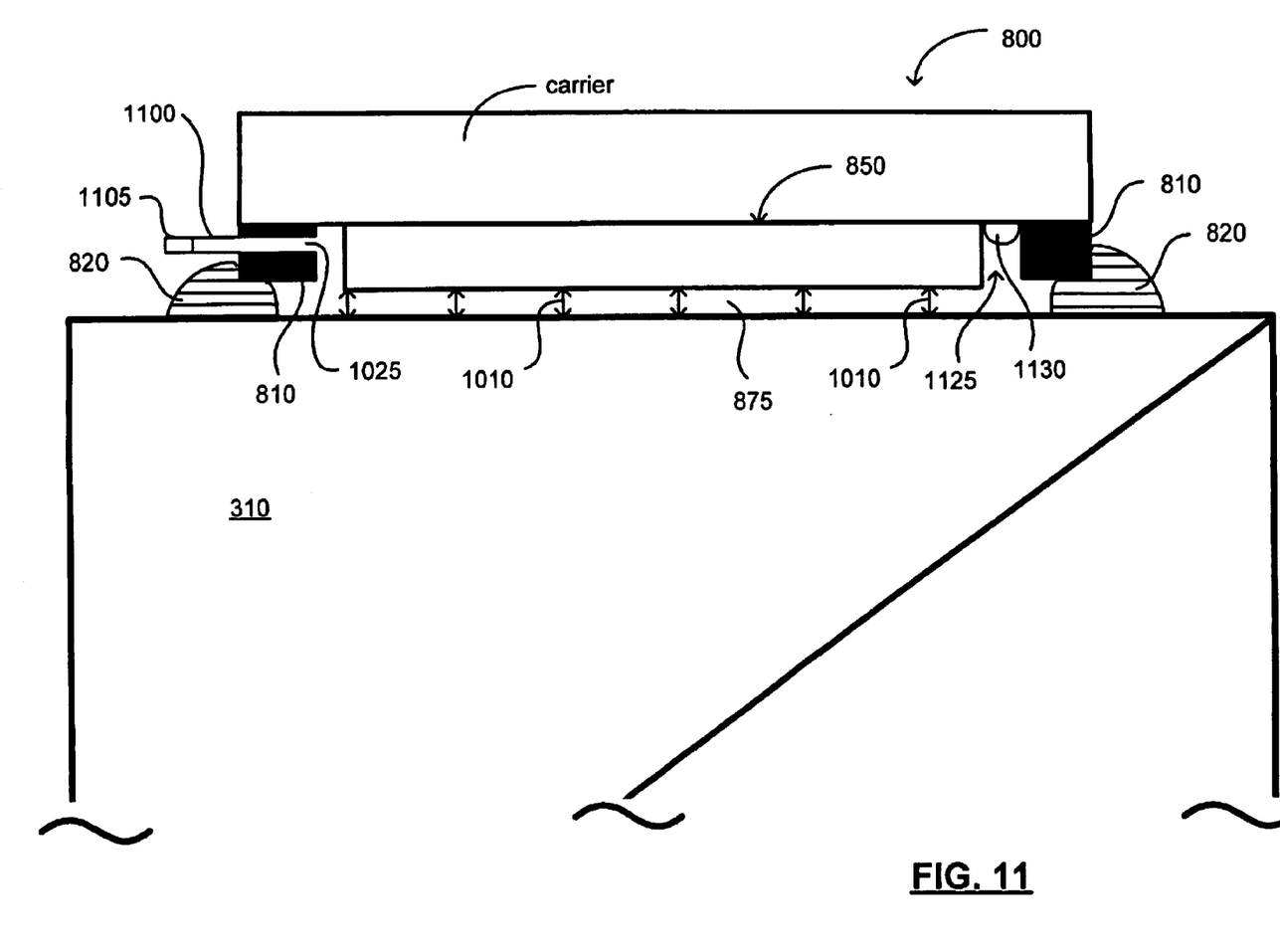
FIG. 11 is an illustration of an air bubble according to an embodiment of the present invention.

In still yet another embodiment, a tube with a piston is inserted into the microdisplay package 800. Again, the tube may be inserted through a hole in the bezel, or may be otherwise accommodated by a cut out in the bezel, inserted through the adhesive, or a combination of the above. Any method of inserting the tubes is acceptable, so long as the open end is in contact with the index matching fluid. In this embodiment, air is not maintained in the tube, and the piston moves out or in to accommodate expansion and contraction of the index matching fluid. The tube may include stops to prevent the piston from falling out of the tube. Stops may be placed on both ends of the tube.

Figure 9:
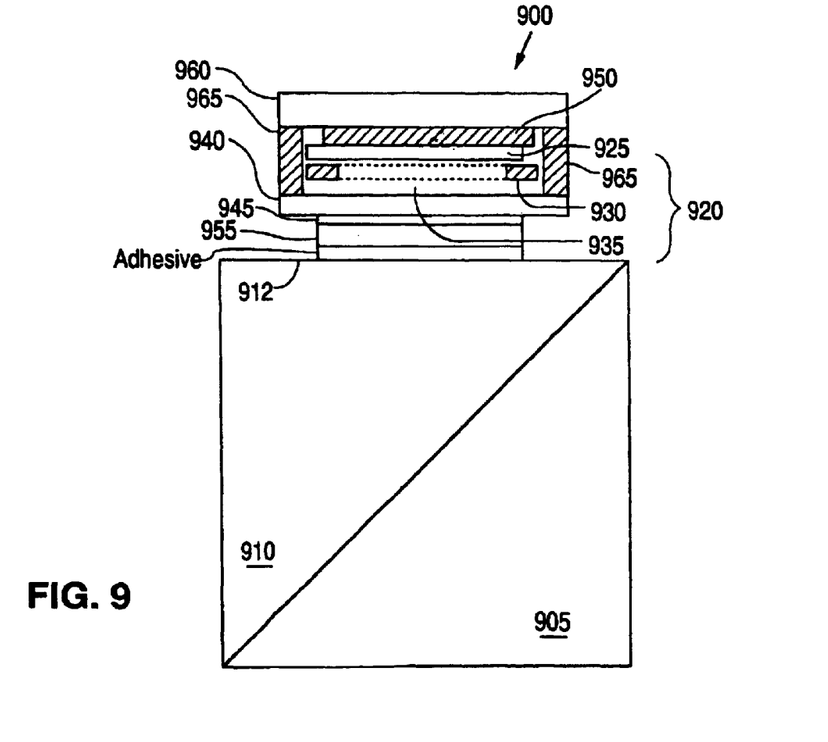
FIG. 9 is an illustration of a combined air gap and direct mounting of a microdisplay package including an optical stack according to an embodiment of the present invention.

FIG. 9 is an illustration of a combined air gap and direct mounting of a microdisplay package 900 including an optical stack 920 according to an embodiment of the present invention.

The microdisplay package includes a carrier 960, bezel 965, and bottom cover glass 940. The microdisplay package 900 holds and encloses the microdisplay 950. The optical stack 920 includes a cover glass 925 of a microdisplay 950, black mask 930, air gap 935, bottom cover glass 940, quarter waveplate 945, and top cover glass 955. Again the optical stack may include additional or less components, or be arranged in a different order depending on the specific application to which the optical stack is being applied. In this example embodiment, the optical stack includes components that are shared with the microdisplay package 900 (e.g., bottom cover glass 940 is part of the package and the optical stack). In addition, the bezel 965 and quarter waveplate provide an overhang that helps guide a dislodging tool toward the adhesive/prism 910 interface for removal of the package.

In another embodiment, a second bezel extends from the quarter waveplate 945 toward surface 912 to provide additional guidance (e.g., see bezel 400 & notch 410 shown in FIG. 4). In another embodiment, the second bezel is installed and adhesive is utilized to seal the bezel to the prism surface 912 and liquid (e.g., optical coupling fluid) is placed between the top cover glass 955 and the prism surface 912. Any and all methods of attaching or coupling a microdisplay package to a prism surface as described elsewhere herein are also applicable to this and other embodiments or variations of the present invention.

In FIG. 9, the optical stack includes an air gap 930, which may also be replaced with an optical coupling fluid (and thereby removing or greatly reducing any need to provide anti-reflection coatings on the glass surfaces).

FIG. 9 represents an innovative LCoS direct mounting system that takes advantage of the best design features discussed herein. Primarily, the embodiment of FIG. 9 provides for each of the advantages associated with a thermal insulation layer, direct mounting, ease of decoupling, cooling, and a lack of exposed surfaces.

Although direct mounted, the embodiment of FIG. 9 transmits little or no mechanical stresses from the prism, bezel, or other components that are either mounted or in contact with other parts. The bezel is not connected to the microdisplay so no stress is transmitted directly from the bezel to the microdisplay.

The air gap 935 provides a very efficient thermal insulator so that heat buildup in the prisms 910, 905, et al., is effectively isolated from the microdisplay 950. A greater surface area of the package around the microdisplay (including carrier 960) helps dissipate any heat that is being conducted in a path toward the microdisplay (heat and stress must first be transmitted up to the carrier and then down to the microdisplay, which provides both physical and thermal isolation for the microdisplay.

One known problem in microdisplay based projectors is that large amounts of dust and other impurities can become lodged or settle on the optical surfaces of prisms and microdisplays. However, in the present invention, and particularly the package 900, all optical surfaces of the microdisplay and prism/microdisplay interfaces are completely enclosed. Dust and other impurities are prevented from reaching the microdisplay and other optical surfaces.

One of the largest problems with current air gap mounting techniques (e.g., see FIG. 2) is that forces or vibrations encountered during manufacture, shipping, and/or installation causes the microdisplays to move out of registration. If the microdisplays move more than 2 microns, they are out of registration causing costly service to re-align. Direct mounting of the microdisplay package, such as that illustrated in FIG. 9, maintains registration of the microdisplay under a wide range of forces from virtually any source. Still further, because the adhesive layer may be removed via a specific force from a chisel, razor blade, or other dislodging tool, the microdisplay may also be easily removed for repair or replacement. In the embodiment of FIG., 9, removal is best performed by placing a razor blade on the surface 912 with a sharp edge contacting the adhesive. A quick blow (or tap) to the razor blade parallel to the plane of surface 912 causes the adhesive to cleave at the adhesive/surface 912 interface, removing the microdisplay package from surface 912.

Although the present invention has been described herein with reference to microdisplays mounted on a prism, the devices and processes of the present invention may be applied to the mounting of other optical or electronic devices.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing index matching fluid, any other equivalent product, such as a coupling fluids, mineral oils, or other products having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to microdisplays, prisms, optical elements, masks, adhesives, positioning mechanisms, fluids, etc., should also be consider in light of any and all available equivalents.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A device package comprising
   a device;
   a carrier comprising a substantially planar platform affixed to a non-optical surface of the device;
   a bezel extending from the carrier toward a plane defined by an optical surface of the device;
   an optical component;
   a liquid placed at least between the optical surface of the device and a surface of the optical component;
   an adhesive layer between the bezel and the optical component; and
   an air filled bladder in the liquid, wherein the air filled bladder is lodged out of lightpaths between the optical component and the device.

2. The microdisplay package according to claim 1, wherein the optical component is a prism assembly in an image projector.

3. The device package according to claim 1, wherein the device is a Liquid Crystal on Silicon (LCoS) microdisplay mounted on a prism assembly in an LCoS television.

4. A device package comprising:
   a device;
   a carrier comprising a substantially planar platform affixed to a non-optical surface of the device;
   a bezel extending from the carrier toward a plane defined by an optical surface of the device;
   an optical component;
   a liquid placed at least between the optical surface of the device and a surface of the optical component;
   an adhesive layer between the bezel and the optical component;
   a hole on one of the bezel and carrier, said hole configured to contact a surface of the liquid and ambient air pressure; and
   a flexible diaphragm covering said hole.

5. The microdisplay package according to claim 4, wherein the optical component is a prism assembly in an image projector.

6. The device package according to claim 4, wherein the device is a Liquid Crystal on Silicon (LCoS) microdisplay mounted on a prism assembly in an LCoS television.

7. A device package comprising:
   a device;
   a carrier comprising a substantially planar platform affixed to a non-optical surface of the device;
   a bezel extending from the carrier toward a plane defined by an optical surface of the device;
   an optical component;
   a liquid placed at least between the optical surface of the device and a surface of the optical component;
   an adhesive layer between the bezel and the optical component;
   a tube affixed to the device having an open end and a closed end, said closed end containing an air bubble, and said open end contacting the liquid.

8. The microdisplay package according to claim 7, wherein the optical component is a prism assembly in an image projector.

9. The device package according to claim 7, wherein the device is a Liquid Crystal on Silicon (LCoS) microdisplay mounted on a prism assembly in an LCoS television.

10. A device comprising:
    a device;
    a carrier comprising a substantially planar platform affixed to a non-optical surface of the device;
    a bezel extending from the carrier toward a plane defined by an optical surface of the device;
    an optical component;
    an adhesive layer between the bezel and the optical component;
    a liquid placed at least between the optical surface of the device and a surface of the optical component, wherein the device is arranged such that lightpaths between the optical component and the device do not pass through a most vertical portion of the enclosed liquid; and
    an air bubble located in the liquid.

11. The microdisplay package according to claim 10, wherein the optical component is a prism assembly in an image projector.

12. The device package according to claim 11, wherein the prism assembly is a liquid coupled prism assembly.

13. The microdisplay package according to claim 10, wherein the optical component is a beamsplitter.

14. The microdisplay package according to claim 13, wherein the beamsplitter is part of a liquid coupled pathlength matched prism assembly.

15. The device package according to claim 10, wherein the device is a Liquid Crystal on Silicon (LCoS) microdisplay mounted on a prism assembly in an LCoS television.

16. A microdisplay package, comprising:
    a microdisplay comprising an optical side having an optical face, a second side opposite the optical side, and a perimeter edge;
    an optical component;
    an optical adhesive layer solidly disposed across the optical face between the optical side of the microdisplay and the optical component;
    a guide configured to guide a dislodging tool toward the optical adhesive;
    wherein:
    the adhesive, when impacted by a striking force of the dislodging tool guided by the guide, cleaves so as to separate the microdisplay from the optical component.

17. The microdisplay package according to claim 16, wherein the microdisplay is a Liquid Crystal on Silicon (LCoS) microdisplay mounted on a prism assembly in an LCoS television.

18. The microdisplay package according to claim 16, further comprising an optical stack contained between the microdisplay and the optical component.

19. The microdisplay package according to claim 16, further comprising:
a bezel surrounding at least a portion of the microdisplay;
wherein the guide is formed into a portion of the bezel.

20. The microdisplay package according to claim 16, further comprising:
a bezel surrounding at least a portion of the microdisplay;
wherein the guide is formed at least in part by a surface of the bezel.

21. The microdisplay package according to claim 16, further comprising:
a bezel surrounding at least a portion of the microdisplay;
wherein the guide is formed from the bezel.

22. The microdisplay package according to claim 16, further comprising a frame surrounding at least part of the microdisplay;
wherein the guide is formed from at least part of the frame.

23. The microdisplay package according to claim 16, wherein the guide is configured so that the dislodging tool, when inserted into the guide, only strikes the adhesive.

24. The microdisplay package according to claim 16, wherein the guide is a bezel.

25. The microdisplay package according to claim 24, wherein the beamsplitter is part of a liquid coupled pathlength matched prism assembly.

26. The microdisplay package according to claim 16, further comprising a carrier attached to the microdisplay;
wherein the guide is a bezel attached to the carrier.

27. The microdisplay package according to claim 26, wherein the bezel comprises at least one sloped edge.

28. The microdisplay package according to claim 27, wherein the prism assembly is liquid coupled.

29. The microdisplay package according to claim 27, wherein the prism assembly is a pathlength matched prism assembly.

30. The microdisplay package according to claim 16, wherein the guide is configured such that a razor blade inserted into the guide strikes the adhesive at an interface of the adhesive and the optical component.

31. The microdisplay package according to claim 16, wherein the optical component is a prism assembly in an image projector.

32. The microdisplay package according to claim 16, wherein the image projector is part of a television.

33. The microdisplay package according to claim 16, wherein the microdisplay is a Liquid Crystal on Silicon LCoS microdisplay and the optical component is a prism assembly in an LCoS television.

34. A microdisplay package, comprising:
a microdisplay comprising an optical side having an optical face, a second side opposite the optical side, and a perimeter edge;
a carrier, comprising a substantially planar and rigid material fixed to the second side of the microdisplay; and
a bezel attached to the carrier and extending from the carrier toward a plane defined by the optical side of the microdisplay.

35. The microdisplay package according to claim 34, wherein the microdisplay is a Liquid Crystal on Silicon (LCoS) microdisplay in an LCoS television.

36. The microdisplay package according to claim 34, further comprising a sloped edge formed on at least pert of the bezel.

37. The microdisplay package according to claim 34, further comprising an optical component; and
an adhesive layer disposed between the bezel and the optical component.

38. The microdisplay package according to claim 37, further comprising a sloped edge formed on at least part of the bezel,
wherein the sloped edge is configured to guide a dislodging tool toward the adhesive.

39. The microdisplay package according to claim 34, wherein the optical component is a prism assembly.

40. The microdisplay package according to claim 39, wherein the prism assembly is a liquid coupled prism assembly.

41. The microdisplay package according to claim 34, wherein the bezel extends past the plane defined by the optical side of the microdisplay.

42. The microdisplay package according to claim 34 further comprising:
an optical component;
an adhesive layer disposed across at least the optical face and between the optical side and the optical component securing the microdisplay to the optical component;
wherein a guide is formed by a notch defined between the bezel and the optical component.

43. The microdisplay package according to claim 42, wherein the bezel comprises a sloped edge configured to direct a dislodging tool into the guide.

44. The microdisplay package according to claim 42, further comprising an optical stack contained between the microdisplay and the optical component.

45. The microdisplay package according to claim 42, wherein:
the adhesive and the optical component share an interface; and
the guide is configured to direct an object inserted into the guide to impact the adhesive layer at the interface.

46. The microdisplay package according to claim 45, wherein the object is directed by the guide to the adhesive interface in a direction substantially parallel to the device surface.

47. The microdisplay according to claim 45, wherein the object is a dislodging tool comprising a razor blade.

48. The microdisplay package according to claim 42, wherein the guide is configured such that when a dislodging tool is inserted into the guide the dislodging tool is directed to the adhesive layer.

49. The microdisplay package according to claim 48, wherein the dislodging tool is directed only to the adhesive layer.

50. The microdisplay package according to claim 48, wherein the adhesive cleaves to release the microdisplay from the optical component when impacted by a striking force from a dislodging tool.

51. The microdisplay package according to claim 42, wherein the optical component is a beam splitter in an image projector.

52. The microdisplay package according to claim 42, wherein the optical component is liquid coupled prism assembly.

53. The microdisplay package according to claim 42, wherein the microdisplay is a reflective microdisplay in a projection television set.

54. The microdisplay package according to claim 42, wherein the microdisplay is a Liquid Crystal on Silicon (LCoS) microdisplay in an LCoS television.

55. The microdisplay package according to claim 34, wherein the second side of the microdisplay is fully encompassed by the material of the carrier.

56. A television, comprising:
    a screen;
    a prism assembly;
    a package attached to the prism assembly, comprising,
      a microdisplay comprising an optical side having an optical face, a second side opposite the optical side, and a perimeter edge,
      a carrier, comprising a substantially planar and rigid material fixed to the second side of the microdisplay, and
      a bezel attached to the carrier and extending from the carrier toward a plane defined by the optical side of the microdisplay;
    a light engine coupled to the prism assembly; and
    a lens configured to focus light emitted from the prism assembly onto the screen.

57. The television according to claim 56, wherein the bezel extends past the plane defined by the optical side of the microdisplay.

58. The television according to claim 57, further comprising a sloped edge formed on at least part of the bezel.

59. The television according to claim 57, further comprising an adhesive applied to the bezel to secure the bezel to the prism assembly.

60. The television according to claim 59, further comprising an optical coupling fluid dispersed between the optical face and the prism assembly.

61. The television according to claim 60, further comprising an optical stack located between the optical face and the prism assembly.

62. The television according to claim 57, wherein the prism assembly includes three microdisplays each fitted into similar packages mounted at different points on the prism assembly.

63. The television according to claim 57, wherein the microdisplay is a reflective Liquid Crystal on Silicon (LCoS) microdisplay.

64. The television according to claim 56, further comprising an optical adhesive layer disposed on the optical face of the microdisplay securing the package to the prism assembly.

65. The television according to claim 64, wherein a guide is formed between the bezel and prism assembly such that, if a dislodging tool is inserted into the guide, the dislodging tool is guided to the adhesive layer.

66. A television, comprising:
    a screen;
    a prism assembly;
    a package attached to the prism assembly, comprising,
      a microdisplay comprising an optical side having an optical face, a second side opposite the optical side, and a perimeter edge,
      an optical adhesive layer solidly disposed across the optical face between the optical side of the microdisplay and the prism assembly, and
      a guide configured to guide a dislodging tool toward the optical adhesive;
    a light engine coupled to the prism assembly; and
    a lens configured to focus light emitted from the prism assembly onto the screen;
    wherein the adhesive, when impacted by a striking force of the dislodging tool guided by the guide, cleaves so as to separate the microdisplay from the prism assembly.

67. The television according to claim 66, wherein the prism assembly includes three microdisplays each fitted into similar packages mounted at different points on the prism assembly.

68. The television according to claim 66, wherein the microdisplay is a reflective Liquid Crystal on Silicon (LCoS) microdisplay.

69. The television according to claim 66, wherein the prism assembly is a liquid coupled prism assembly.

70. The television according to claim 66, wherein the prism assembly is a liquid coupled pathlength matches prism assembly.

71. The television according to claim 66, wherein the television is a Liquid Crystal on Silicon (LCoS) television.

72. A device package, comprising
    a device;
    a carrier comprising a substantially planar platform affixed to a non-optical surface of the device;
    a bezel extending from the carrier toward a plane defined by an optical surface of the device;
    an optical component;
    a liquid placed at least between the optical surface of the device and a surface of the optical component;
    an adhesive layer between the bezel and the optical component; and
    a stress reduction mechanism configured to reduce stress on the device.

73. The device package according to claim 72, wherein the stress reduction mechanism contacts the liquid and reduces differential expansion related stresses on the device.

74. The device package according to claim 73, wherein:
    the device is LCoS microdisplay; and
    the optical component is a prism assembly of a LCoS projection device.

75. The device package according to claim 74, wherein the LCoS projection device is a LCoS projection television.

76. The device package according to claim 72, wherein the stress reduction mechanism comprises an air bladder in the liquid.

77. The device package according to claim 72, wherein the stress reduction mechanism comprises an air bubble in the liquid.

78. The device package according to claim 72, wherein the stress reduction mechanism comprises a tube in contact with the liquid and an air bubble enclosed in the tube.

79. The device package according to claim 72, wherein the stress reduction mechanism comprises a flexible diaphragm attached to the bezel and contacting the liquid.

80. The device package according to claim 72, wherein the stress reduction mechanism comprises a flexible diaphragm attached to the carrier.

81. The device package according to claim 72, wherein the reduced stress comprises at least one of differential expansion related stress and mechanically induced stress.

\* \* \* \* \*